United States Patent
Brombach et al.

(10) Patent No.: US 9,457,805 B2
(45) Date of Patent: Oct. 4, 2016

(54) VEHICLE WITH POWER MANAGEMENT

(71) Applicant: FORD GLOBAL TECHNOLOGIES, LLC, Dearborn, MI (US)

(72) Inventors: Ronald Patrick Brombach, Plymouth, MI (US); James Michael Weinfurther, Farmington, MI (US); David J. Dainelis, Middleville, MI (US); Michael J. Irby, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 45 days.

(21) Appl. No.: 14/487,587

(22) Filed: Sep. 16, 2014

(65) Prior Publication Data

US 2016/0075324 A1 Mar. 17, 2016

(51) Int. Cl.
*B60W 30/045* (2012.01)
*B60W 30/188* (2012.01)
*B60W 10/20* (2006.01)
*B60W 10/30* (2006.01)

(52) U.S. Cl.
CPC ............ *B60W 30/045* (2013.01); *B60W 10/20* (2013.01); *B60W 10/30* (2013.01); *B60W 30/1886* (2013.01)

(58) Field of Classification Search
CPC ......... B60W 30/045; B60W 30/1886; B60W 10/30; B60W 10/20

USPC .......................................................... 701/48
See application file for complete search history.

(56) References Cited

U.S. PATENT DOCUMENTS

| | | | |
|---|---|---|---|
| 6,073,536 A | 6/2000 | Campbell | |
| 6,163,985 A | 12/2000 | Chinnery et al. | |
| 8,489,266 B2 * | 7/2013 | Ueda | B60L 1/003 320/150 |
| 8,589,026 B2 | 11/2013 | Holt et al. | |
| 2010/0082198 A1 * | 4/2010 | Arai | B60R 16/033 701/31.4 |
| 2010/0217475 A1 | 8/2010 | Menze et al. | |
| 2013/0001006 A1 * | 1/2013 | Gibson | B62D 5/0481 180/446 |
| 2014/0049381 A1 | 2/2014 | Moon, Jr. et al. | |

* cited by examiner

*Primary Examiner* — Brian P Sweeney
(74) *Attorney, Agent, or Firm* — Frank A. MacKenzie; Brooks Kushman P.C.

(57) ABSTRACT

An electronic control unit may include input channels configured to receive signals indicative of a power to a steering system and signals indicative of an operating mode of the vehicle, and output channels configured to provide a command to redistribute current from an electrical load to the steering system. The electronic control unit may further include control logic configured to, in response to the power falling below a threshold value and the operating mode being of a pre-defined type, generate the command to increase the power to the steering system to meet the threshold value.

11 Claims, 2 Drawing Sheets

VEHICLE WITH POWER MANAGEMENT

TECHNICAL FIELD

The present disclosure relates to power management for vehicle steering systems.

BACKGROUND

Certain vehicles may be equipped to allow an accessory, such as a snow plow, to be used with the vehicle. These accessories are typically relatively heavy and may, especially when mounted to the front end of the vehicle, affect steering operations by causing an electric motor driving a steering linkage of an electronic power assisted steering (EPAS) system to consume power.

SUMMARY

A method of managing electrical power in a vehicle includes, in response to power to a steering system falling below a threshold value and the vehicle being operated in a pre-defined mode, redirecting current from an electrical load to the steering system to increase the power to the steering system to meet the threshold value.

A vehicle includes a motor configured to drive a steering linkage and a control unit. The control unit is programmed to, in response to power to the motor falling below a threshold value and the vehicle being operated in a pre-defined mode, redirect current from an electrical load to the motor to increase the power to the motor to meet the threshold value.

An electronic control unit for a vehicle is provided. The electronic control unit may include input channels configured to receive signals indicative of a power to a steering system and signals indicative of an operating mode of the vehicle, and output channels configured to provide a command to redistribute current from an electrical load to the steering system. The electronic control unit may further include control logic configured to, in response to the power falling below a threshold value and the operating mode being of a pre-defined type, generate the command to increase the power to the steering system to meet the threshold value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may be equipped with electronic power assisted steering, hereinafter "EPAS," to provide smooth vehicle driving operations. The EPAS system requires electrical power in order to function. For example, the EPAS system may require a minimum of 75 amps of current to ensure proper functioning of the steering system during all operating conditions. The power available to the EPAS system may drop below the minimum amperage if, for example, an accessory is mounted to the vehicle. When an accessory is attached, a motor driving a steering linkage of the EPAS system may require more power to account for the added weight of the accessory. This may affect steering operations. Therefore, it may be advantageous to utilize energy management to account for such effects.

Energy management control logic that maintains a minimum threshold level of power to the EPAS system steering linkage motor when an accessory is attached is contemplated. The energy management control logic monitors signals and power requests from one or more vehicle systems to ensure the EPAS system maintains power above a threshold. This ensures proper EPAS system performance while the accessory is in use. The control logic may disable certain vehicle electrical loads that would otherwise consume large amounts of power. When activated, the control logic diverts the power used by various electrical loads to the EPAS system motor. The control logic may allow the EPAS system to maintain, for example, at least 75 amps in reserve (other thresholds are also possible). This ensures the EPAS system will have enough power to drive the motor in order to turn the steering linkage when an accessory is attached. Maintaining a desired amount for the EPAS system motor ensures proper functioning of the EPAS system.

Figure 1:
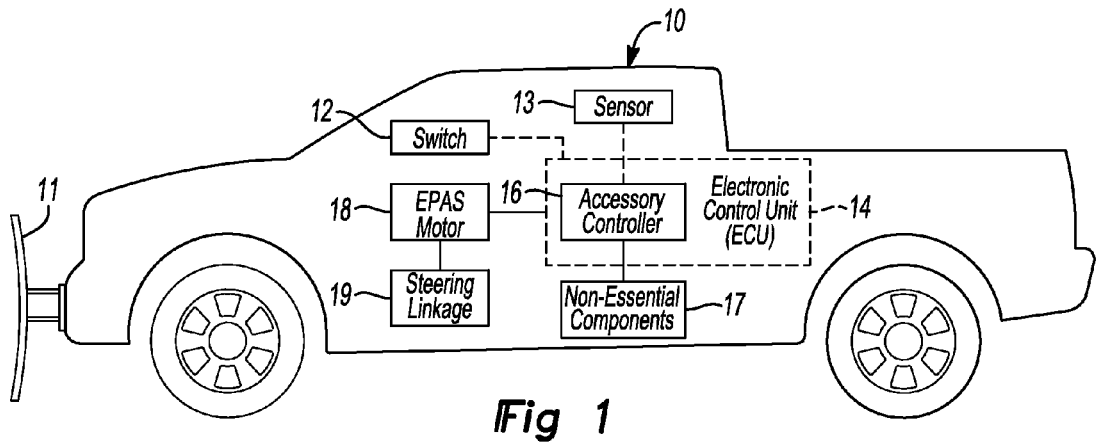
FIG. 1 is a schematic of a vehicle.

FIG. 1 depicts a vehicle 10 having energy management control logic contemplated by the present disclosure. For clarity of description, the system is described as having separate controllers; however it is also possible for the different processes to be run by a single controller as is well known in the art.

As will be described in more detail below, when an accessory 11 is mounted to the vehicle, a driver can activate an interface 12. Activation of the interface 12 signals the presence of the accessory 11 to an electronic control unit 14, hereinafter "ECU." In a preferred embodiment, the interface may be a driver-operated switch. However, the interface may be any human/machine interface such as, but not limited to, a pressure sensor, a heat sensor, a voice command, or any other user-activated human/machine interface. The interface 12 may provide a hardwired or wireless input to the ECU 14.

The ECU 14 then activates, via an accessory controller 16, an accessory mode. The accessory mode may then redirect current from non-essential electrical components 17 consuming current to an EPAS system motor 18. This allows the ECU 14, through activation of the accessory mode, to redirect power to the EPAS system motor 18. The EPAS system motor 18 may use the reserved power to drive a steering linkage 19. This allows for normal steering operations despite the attachment of the accessory 11.

The ECU 14 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As generally illustrated in the representative embodiment of FIG. 1, the ECU 14 may communicate signals to and/or from the accessory controller 16, the EPAS system motor 18, the non-essential electrical components 17, the steering linkage 19, and the interface 12. Although not explicitly illustrated, those of ordinary skill in the art will recognize various functions or components that may be controlled by the ECU 14 within each of the subsystems identified above. Representative examples of parameters, systems, and/or components that may be directly or indirectly actuated using control logic executed by the ECU 14 include front-end accessory drive (FEAD) components such as an alternator, air conditioning compressor, battery charging, and the like. Sensors 13 communicating input through the I/O interface may be used to indicate electrical power consumption of a vehicle steering system and various non-essential electrical components, such as heated/cooled seats, heated steering wheel, fog lamps, and ignition switch position, for example.

Figure 2:
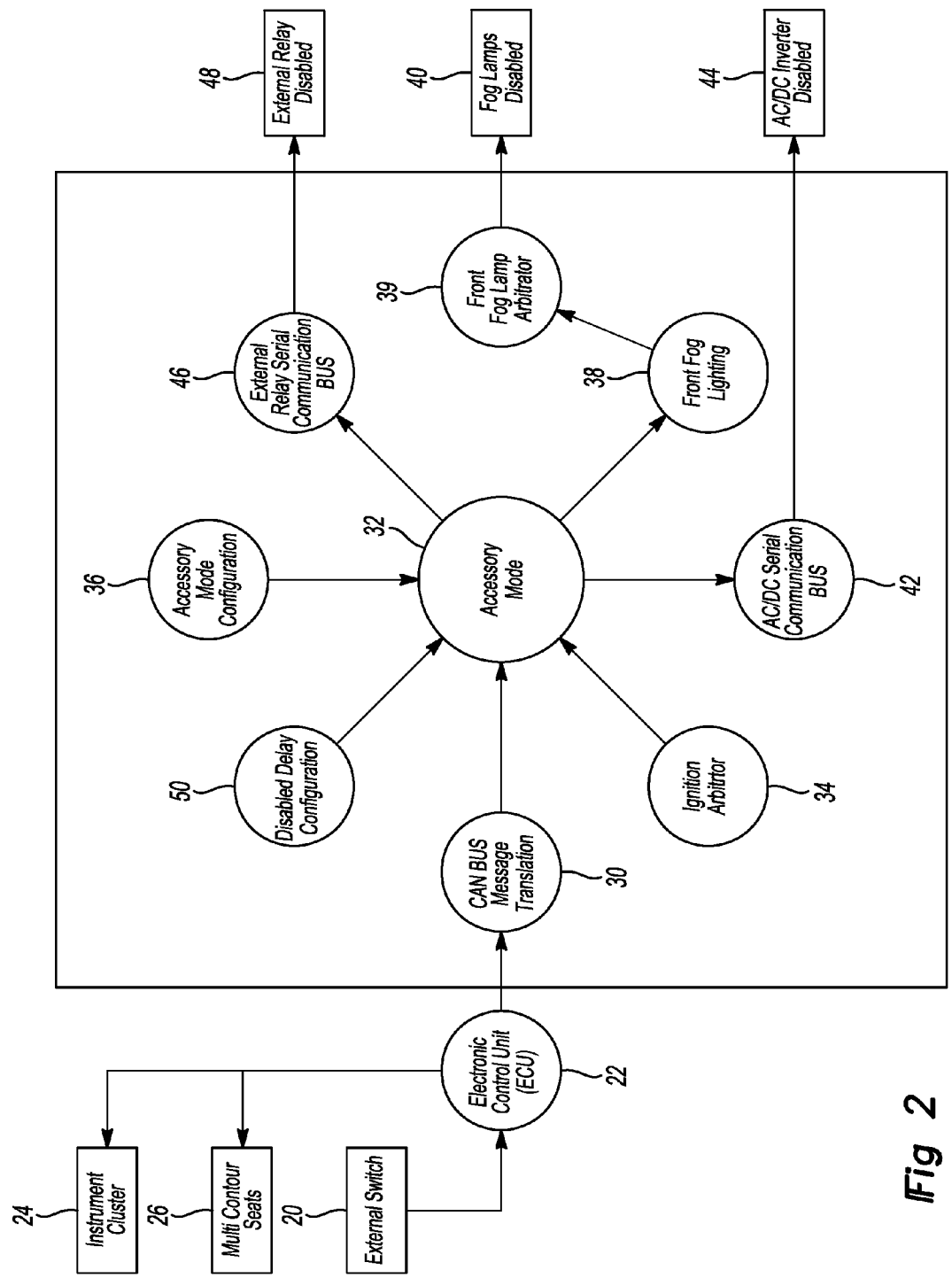
FIG. 2 depicts a system architecture of an energy management technique for a vehicle.

Referring to FIG. 2, the architecture of an energy management technique implemented by software residing in one or more processors (such as the ECU 14) is depicted. At 20, an accessory mode command is generated (by actuating interface 12, for example) to operate the vehicle 10 in an accessory mode. A signal may be sent to an instrument cluster (or other display) at 24, to provide a visual indication to the driver that the accessory mode is activated. The ECU 14 then identifies and disables non-essential power consuming electrical components of the vehicle 10 as necessary to ensure that the EPAS system is supplied with at least the minimum threshold level of power. For example, after the accessory mode has been enabled, vehicle electrical components such as a heated steering wheel and temperature controlled (heated/cooled) seats may be disabled, at 26. This allows the electrical loads necessary to provide these features to be re-directed to a vehicle steering system.

A CAN message translation module, at 30, allows the ECU 14 to receive the request to enable the accessory mode and alert the accessory controller 16 that an accessory mode request is present, at 32. Also at 32, the accessory controller 16 may receive, through the CAN message translation module of the ECU 14, the communication status of the accessory mode request. This allows the accessory controller 16 to verify that the CAN translation module of the ECU 14 is receiving a signal of the request for the accessory mode.

The ECU 14 may also send a signal to the accessory controller 16 indicating the ignition status at 34. The accessory mode may only be used if the ignition status is set to "run" at 34. This ensures that the vehicle will be supplied with enough power to run the accessory mode. If the ignition status is set to "run," at 34, and the accessory mode request and communication status are present, at 32, the ECU 14 signals to the accessory controller 16 that the accessory mode has been enabled at 36. In at least one embodiment, the accessory controller 16 may have a plurality of configurations. For example, one configuration, at 36, allows the accessory controller 16 to immediately disable and re-enable the non-essential electrical components upon activation of the interface 12, at 20. Once the accessory controller 16 receives an accessory mode configuration signal, at 36, from the ECU 14, the accessory controller 16 may then alert a plurality of non-essential electrical components of the accessory mode status, at 38, 42, and 46. This allows the accessory controller 16 to control the operational states of the non-essential electrical components in order to conserve and divert power from the electrical loads of the electrical components. This allows the accessory controller 16 to manage the power flowing to the EPAS system.

For example, if the accessory mode is active at 36, the accessory controller 16 may send a signal to the ECU 14 to disable the front fog lighting at 38. The ECU 14 may translate the signal disabling the front fog lighting at 38 through a front fog lamps arbitrator at 39. This would result in the front fog lamps being disabled at 40. Likewise, the accessory controller 16 may send a signal to the ECU 14 to disable an AC/DC inverter at 42. The ECU 14 may process this signal through a vehicle serial communication BUS. This would result in the AC/DC inverter being disabled at 44. Further, the accessory controller 16 may send a signal to the ECU 14 to disable the external relay at 46. The ECU 14 may also process this signal through a vehicle serial communication BUS. This results in the external relay being disabled at 48.

In at least another configuration, the accessory controller 16 may also be configured to allow the accessory mode to remain enabled even if the accessory mode request is not present, at 32, or also if the communication status of the accessory mode request is not present, at 32. If either the accessory mode request or the communication status of the accessory mode request is not present, then the accessory controller may enter a disabled delay configuration at 50. The disabled delay configuration, at 50, prolongs disabling of the non-essential electrical components at 38, 42, and 46.

The disabled delay configuration, at 50, of the accessory controller 16 may last for a predetermined period of time. For example, the predetermined period of time may last for less than one second, or more specifically approximately 500 ms before disabling the accessory mode. For example, the EPAS system steering linkage motor may still require power for a short duration after the driver has removed the request for the accessory mode at 50. After approximately 500 ms, however, the non-essential electrical components may return to their normal operational states. This configuration of the accessory controller 16, as stated above, may only be operational when the ignition status is set to run at 34. Therefore, the disabled delay configuration, at 50, of the accessory controller 16 may only be enabled if the engine is running.

Figure 3:
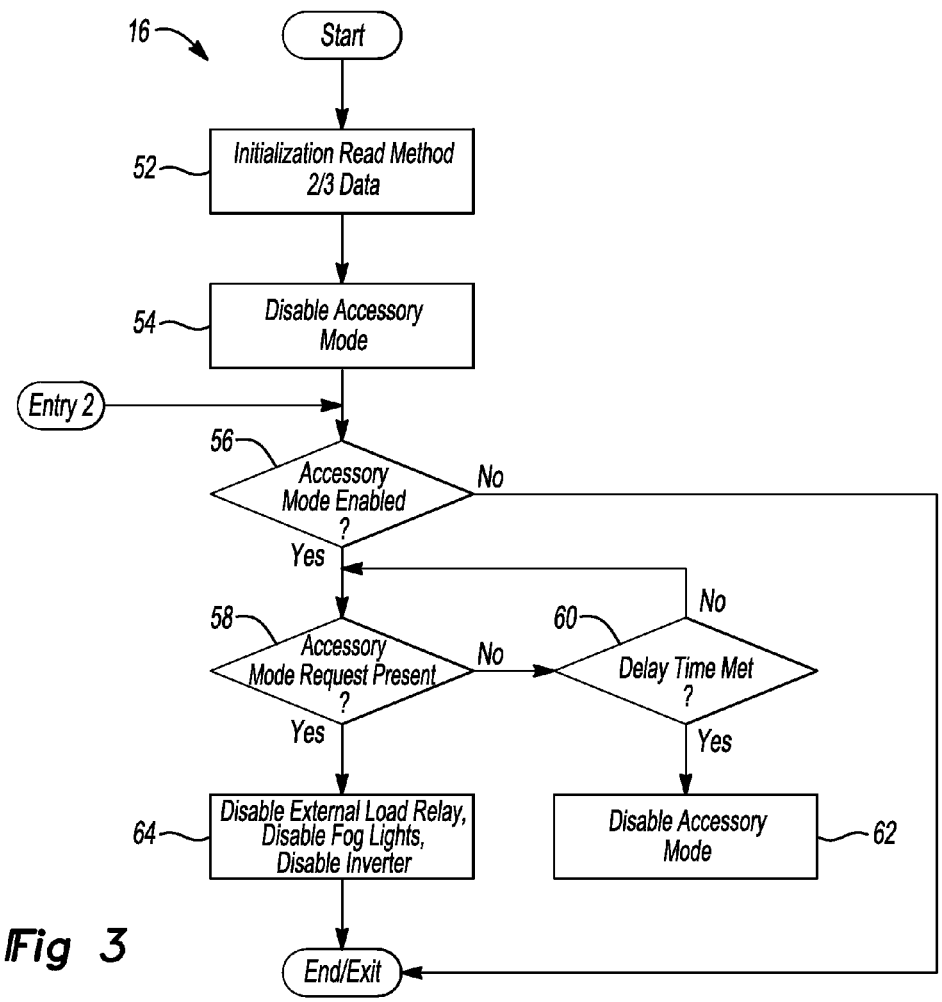
FIG. 3 is a flowchart depicting energy management control logic for a vehicle.

Referring to FIG. 3, the energy management control logic of the accessory controller 16 is depicted. At 52, the accessory controller 16 runs through an initialization state. The initialization state, at 52, requires the accessory controller 16 to send and receive the accessory mode requests, ignition status, and communication status of the accessory mode request as described above. Despite sending and receiving the accessory mode request, the ignition status, and the communication status of the accessory mode request at 52, the accessory controller 16 disables the accessory mode at 54. This means the non-essential electrical components, such as the external load relay, fog lights, and AC/DC converter work normally at 54. This initialization state allows the accessory controller 16 to refresh operations. For example, the initialization state at 52 may only be entered into upon a battery reset, a latched relay, or initial install.

At 56, the accessory controller 16 will decide if the accessory mode is enabled. Enabling the accessory mode, at 56, requires use of the request and signal architecture as described in FIG. 2. If the accessory controller 16 decides, at 56, that the accessory mode is not requested, the ignition status is not set to run, or there is a lack of communication status of the accessory mode request, the vehicle 10 may operate under normal operational states. If at 56, the accessory controller 16 decides that the accessory mode is requested, the accessory controller 16 decides at 58 if the accessory mode request is present. At 58, the accessory controller 16 may check to see if the communication status of the accessory mode request as well as the accessory mode request is present. For example, if at 58 the accessory mode request is present but there is no communication status for the accessory mode request, or vice versa, the accessory controller 16 may not enable the accessory mode.

If at 58, either the accessory mode request or the communication status of the accessory mode request is not present, the accessory controller 16 will decide if the delay time has been met at 60. This is consistent with the disabled delay configuration of the accessory controller 16 as described above. Therefore, if at 60 the delay time has not been met or the delay time has not been exceeded, the accessory controller 16 may recheck for the accessory mode request or the communication status of the accessory mode request, consistent with whichever request was not present at 58. If, however, at 60 the delay time of the disabled delay configuration has been met or has been exceeded, the accessory controller 16 may disable the accessory mode at 62. Once the accessory mode has been disabled at 62, the non-essential electrical components, such as the external load relay, the fog lights, or that AC/DC inverter, will return to their normal operational states.

If at 58 both the accessory mode request and the communication status of the accessory mode request are present, the accessory controller 16 will enable the accessory mode at 64. Once the accessory mode is enabled at 64, the accessory controller 16 may begin to divert current, and likewise power, to the EPAS system steering linkage motor from the non-essential electrical loads. The accessory controller 16 may divert current from the non-essential electrical loads to the EPAS system motor as described above. For example, once the accessory mode has been enabled at 64, the external load relay may be disabled, the fog lights may be disabled, and the AC/DC inverter may be disabled at 64. When the interface 12 is activated, the ECU 14 enables the accessory mode, via the accessory controller 16, disabling the non-essential electrical components as described above. This allows the accessory controller 16 to supply power to the vehicle steering system in order to compensate for the additional load on the EPAS system motor and steering linkage when an accessory is being used on the vehicle 10.

The embodiments of the present invention as set forth herein generally illustrate and describe a plurality of controllers (or modules), or other such electrically-based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired to be intended to be implemented in the vehicle. The controllers may be combined with each other and/or separated in any manner based on the particular type of electrical architecture that is desired in the vehicle. It is generally recognized that each controller and/or module/device disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electrical power management system for a vehicle comprising:
   a steering system; and
   a controller configured to,
      in response to power to the steering system falling below a threshold value and the vehicle being operated in a pre-defined accessory mode, redirect current from an electrical load to the steering system to increase the power to the steering system to meet the threshold value, and
      in response to a command to exit the pre-defined accessory mode, continue the redirecting for a predetermined period of time less than one second.

2. The system of claim 1, wherein redirecting current from the electrical load to the steering system includes disabling the electrical load.

3. The system of claim 1, wherein the controller is further configured to receive input selecting the pre-defined mode.

4. The system of claim 1, wherein the electrical load is a fog lamp, an inverter, or a relay.

5. The system of claim 1, wherein the controller is further configured to activate an indicator light in response to the redirecting.

6. A vehicle comprising:
   a motor to drive a steering linkage; and
   a controller programmed to,
      in response to motor power falling below a threshold and the vehicle being operated in an accessory mode, redirect current from an electrical load to the motor to increase the motor power to meet the threshold, and
      in response to a command to exit the accessory mode, continue the redirecting for a predetermined time period less than one second.

7. The vehicle of claim 6 further comprising an interface disposed within the vehicle and operable to be activated by a user to request the accessory mode.

8. The vehicle of claim 6, wherein redirecting current from the electrical load to the motor includes disabling the electrical load.

9. An electronic control unit for a vehicle comprising:
input channels configured to receive signals indicative of a power to a steering system, signals indicative of an operating mode of the vehicle, and signals indicative of a request to exit the operating mode;
output channels configured to provide commands to redistribute current from an electrical load to the steering system; and
control logic configured to, in response to the power falling below a threshold value, generate a command to increase the power to the steering system to meet the threshold value, and in response to the request to exit the operating mode, delay generating the command for a predetermined period of time less than one second.

10. The electronic control unit of claim 9, wherein execution of the command to increase the power to the steering system to meet the threshold value causes the electrical load to be disabled.

11. The electronic control unit of claim 9, wherein the electrical load is a fog lamp, an inverter, or a relay.

* * * * *